US009559389B2

(12) United States Patent
Greef et al.

(10) Patent No.: US 9,559,389 B2
(45) Date of Patent: Jan. 31, 2017

(54) DAISY CHAIN COMMUNICATION BUS AND PROTOCOL

(71) Applicant: Datang NXP Semiconductors Co., Ltd., Jiangsu (CN)

(72) Inventors: Pierre De Greef, Waalre (NL); Matheus Johannus Gerardus Lammers, Nederweert (NL); Johannes Petrus Maria Van Lammeren, Beuningen (NL)

(73) Assignee: DATANG NXP SEMICONDUCTORS CO., LTD., Jiangsu (CN)

( * ) Notice: Subject to any disclaimer, the term of this patent is extended or adjusted under 35 U.S.C. 154(b) by 706 days.

(21) Appl. No.: 13/938,416

(22) Filed: Jul. 10, 2013

(65) Prior Publication Data

US 2015/0019771 A1 Jan. 15, 2015

(51) Int. Cl.
*G08C 19/22* (2006.01)
*H04Q 9/00* (2006.01)
(Continued)

(52) U.S. Cl.
CPC ........ *H01M 10/425* (2013.01); *B60L 11/1862* (2013.01); *B60L 11/1864* (2013.01); *G06F 13/4247* (2013.01); *H01M 2010/4278* (2013.01); *H01M 2220/20* (2013.01); *Y02T 10/7005* (2013.01); *Y02T 10/7044* (2013.01); *Y02T 10/7061* (2013.01); *Y02T 90/16* (2013.01)

(58) Field of Classification Search
CPC ............... H01M 10/48; H01M 10/482; H01M 2010/4278
USPC ............... 340/870.01-870.44; 324/425-450, 324/76.11-157; 702/63; 320/106, 320/137-165
See application file for complete search history.

(56) References Cited

U.S. PATENT DOCUMENTS 5,698,967 A * 12/1997 Baer .................. B60L 11/1846
320/119
6,274,950 B1 * 8/2001 Gottlieb ............. G01R 31/3648
307/66
(Continued)

OTHER PUBLICATIONS

Chow, M. et al. "Online Battery Modeling and State Estimation", NC State University, ADAC, 23 pgs. (Aug. 23, 2011)).
(Continued)

*Primary Examiner* — Firmin Backer
*Assistant Examiner* — Jerold Murphy
(74) *Attorney, Agent, or Firm* — Paul M. H. Pua; Foley & Lardner LLP

(57) ABSTRACT

A battery pack has first and second battery terminals, plural battery cells each with a battery element, a cell supervisor electrically connected to the battery element, and a communication section to communicate with the cell supervisor. The battery elements are connected serially between the first and second battery terminals. Bus interfaces are arranged in alternating fashion with the battery cells to define a daisy chain bus, each such bus interface being configured for signal communication, the interfaces respectively connecting the communication sections of two adjacent battery cells. A battery manager communicates with the battery cells via the daisy chain bus. The battery manager sends a command message to the battery cells using a through mode protocol, and each battery cell sends at least one of a confirmation message and a service request to the battery manager using a shift mode protocol.

20 Claims, 8 Drawing Sheets

(51) Int. Cl.
   *H01M 14/00* (2006.01)
   *G01R 31/36* (2006.01)
   *H02J 7/04* (2006.01)
   *H02J 7/16* (2006.01)
   *H01M 10/42* (2006.01)
   *G06F 13/42* (2006.01)
   *B60L 11/18* (2006.01)

(56) References Cited

U.S. PATENT DOCUMENTS

| | | | |
|---|---|---|---|
| 8,904,049 B2 * | 12/2014 | McCormick | B60L 11/1864 320/134 |
| 9,000,935 B2 * | 4/2015 | Dao | H04Q 9/00 320/107 |
| 2010/0259221 A1 * | 10/2010 | Tabatowski-Bush | B60L 3/0046 320/134 |
| 2011/0082955 A1 * | 4/2011 | Wortham | G06F 13/12 710/110 |

OTHER PUBLICATIONS

Rako, P. "Battery-Stack-Monitor ICs Scrutinize the Cells", 7 pgs. (Jan. 20, 2011), retrieved from the Internet at http://www.edn.com/Home/PrintView?contentItemId=4363937(May 19, 2013).

* cited by examiner

DAISY CHAIN COMMUNICATION BUS AND PROTOCOL

FIELD OF THE INVENTION

Battery management systems are well-suited for use in electric vehicles (both fully-electric and hybrid), and other arrangements where it is desirable to control the battery to improve performance.

Electric vehicles are propelled by electric motors, and are energized by a set of batteries. Typically about 100 lithium-ion battery cells (collectively, a battery or battery pack) store the energy required to drive the vehicle. The batteries can be charged by the power grid or an internal combustion engine (e.g., as a hybrid engine or a range extender).

For optimal performance the following battery properties are preferably monitored: State-of-Charge, State-of-Function and State-of-Health. This information can be used to inform the driver of the vehicle's estimated remaining driving range (a fuel gauge function) and the probability of the vehicle being able to reach the desired destination. Also, this information can be used by the battery manager to improve the performance of the battery, which is critical for any electric vehicle due to the relatively short driving range and limitations on the ability to recharge the battery.

In order to accomplish this, the battery manager should be able to communicate with the battery cells.

In the automotive market various communication bus systems exist. Automobiles may contain a LIN bus for low-cost body electronics, a CAN bus for mainstream power-train communications, and a FlexRay bus for high-end applications. Each such bus is used with suitable vehicle components, and each component will have a transceiver for effecting communication via the bus.

SUMMARY OF THE INVENTION

One example embodiment involves a battery pack having first and second battery terminals, and plural battery cells, each such battery cell include a battery element, a cell supervisor electrically connected to the battery element, and a communication section configured to communicate with the cell supervisor. All of the battery elements are connected serially between the first and second battery terminals. Bus interfaces are arranged in alternating fashion with the battery cells to define a daisy chain bus, each such bus interface being configured for signal communication, the bus interfaces respectively connecting the communication sections of two adjacent battery cells. A battery manager is configured to communicate with the battery cells via the daisy chain bus. The battery pack is configured so that the battery manager sends a command message to the battery cells using a through mode protocol, and each battery cell sends at least one of a confirmation message and a service request to the battery manager using a shift mode protocol.

The battery pack may include a communication module with a cell manager, the communication module being configured for signal communication between the battery manager and the daisy chain bus.

Such a battery pack can also include a communication module with a cell manager electrically connected across a resistor, the resistor being connected between ground potential and one of the first and second battery terminals, the communication module being configured for signal communication between the battery manager and the daisy chain bus.

This battery pack can be configured so that communication between the battery manager and the battery cells is effecting using half-duplex communication with time division multiplexing.

The battery pack can be configured so that, when the battery manager sends the command message to the battery cells using the through mode protocol, all of the battery cells except the battery cell most remote from the battery manager receives the command message and then relays the command message to the next battery cell.

The battery pack's confirmation message can include data reflecting a condition of the battery cell.

The battery pack can be configured so that, when each battery cell receives the command message that battery cell sends at least one of the confirmation message and the service request towards the battery manager. Also, that battery cell can send at least one of the confirmation message and the service request towards the battery manager by forwarding the at least one of the confirmation message and the service request to an adjacent battery cell which is closer along the daisy chain bus to the battery cell manager.

Another example embodiment is a battery cell for use in a battery pack having battery manager can include a battery element, a cell supervisor electrically connected to the battery element, and a communication section configured to communicate with the cell supervisor. The battery cell is configured to receive a command message from the battery manager using a through mode protocol, and to send at least one of a confirmation message and a service request to the battery manager using a shift mode protocol.

In the battery cell, the confirmation message can include data reflecting a condition of the battery cell.

The battery cell can be configured so that, when the battery cell receives the command message, the battery cell sends at least one of the confirmation message and the service request towards the battery manager.

Yet another example embodiment is a method of communication via a daisy chain bus connecting a battery manager and a plurality of battery cells involves sending, via the daisy chain bus, a command message from the battery manager to the battery cells using a through mode protocol, and sending, via the daisy chain bus, at least one of a confirmation message and a service request from at least one battery cell to the battery manager using a shift mode protocol.

The method also can include using half-duplex communication with time division multiplexing to effect the sending of the command message and the sending of at least one of the confirmation message and the service request.

In the method, the sending of the command message to the battery cells can include all of the battery cells except the battery cell most remote from the battery manager receiving the command message and then relaying the command message to a next battery cell.

In the method, the confirmation message can include data reflecting a condition of the battery cell.

The method also can include, when each battery cell receives the command message, that battery cell sending at least one of the confirmation message and the service request towards the battery manager.

In the method, the sending by that battery cell of at least one of the confirmation message and the service request towards the battery manager can include forwarding the at least one of the confirmation message and the service request to an adjacent battery cell which is closer along the daisy chain bus to the battery cell manager.

The method also can involve sending, from the battery cell to the battery manager, an acknowledgement message including an acknowledgement and at least one of status information and battery cell data.

The method can include sending, from the battery manager, an interrupt message to at least some of the battery cells forcing control over the system.

The method also can involve sending, from a battery cell, a service request message to the battery manager requesting a service due to an alarm condition.

BRIEF DESCRIPTION OF THE DRAWINGS

The invention will be described in greater detail hereinafter with reference to example embodiments depicted in the accompanying drawings, described below, and which are illustrative and to which the invention is not limited.

DETAILED DESCRIPTION OF EXEMPLARY EMBODIMENTS

A low-cost serial communication bus and protocol has been developed to connect and effect data transfer for a set of battery cells, each cell having an integrated supervisor circuit, to a battery management unit. This bus and protocol together enable real-time parameter control and observation by the battery management unit, with a high level of safety and integrity.

The high voltage required to operate an electric vehicle can be challenging—in such a vehicle, multiple batteries are connected in series to provide the required power. To keep the generated current within acceptable levels, the operating voltage can be on the order of 1000 volts (this is only by way of non-limiting example, and lower and higher voltage levels could be employed). The interface used with the battery cell supervisor circuits therefore needs to be able to work with electrical potentials on the order of 1000 V.

The bus described herein uses low-cost, single-wire connections (a "daisy-chain" bus) to provide a high-speed data interface suitable for use in a battery pack. By virtue of the daisy-chain bus configuration, each individual supervisor circuit need not span a high voltage, instead the circuit can operate and interface at the individual battery cell voltage, hence the supervisor circuit can be powered by the associated battery cell. This moderate operating voltage level and moderate level-shifting towards adjacent supervisory circuits, permits an implementation of the supervisory circuit without the need for galvanic isolation circuitry.

The daisy-chain concept, which is mentioned in "Battery-Stack-Monitor ICs Scrutinize the Cells" by Rako, EDN Network website (20 Jan. 2011), introduces large timing latencies. New methods have been developed to address such transmission latencies, for both acknowledge and service request communications.

An innovative battery management system has been developed in which each battery cell includes an integrated circuit which can monitor all relevant parameters of the associated battery cell in an accurate and efficient way. In this system, each battery cell is controlled by a lithium-ion in-cell supervisor (LIICS) circuit, and this LIICS device can enable new features through the local measurement and preprocessing of data. More specifically, this arrangement can (1) offer improved measurement accuracy with higher sample rates, (2) provide an integrated solution requiring fewer components and less material, (3) support impedance measurements, which can be used for sensor-less in-cell temperature determination, and/or (4) support passive charge balancing (controlled bleeding of particular battery cells).

Figure 1:
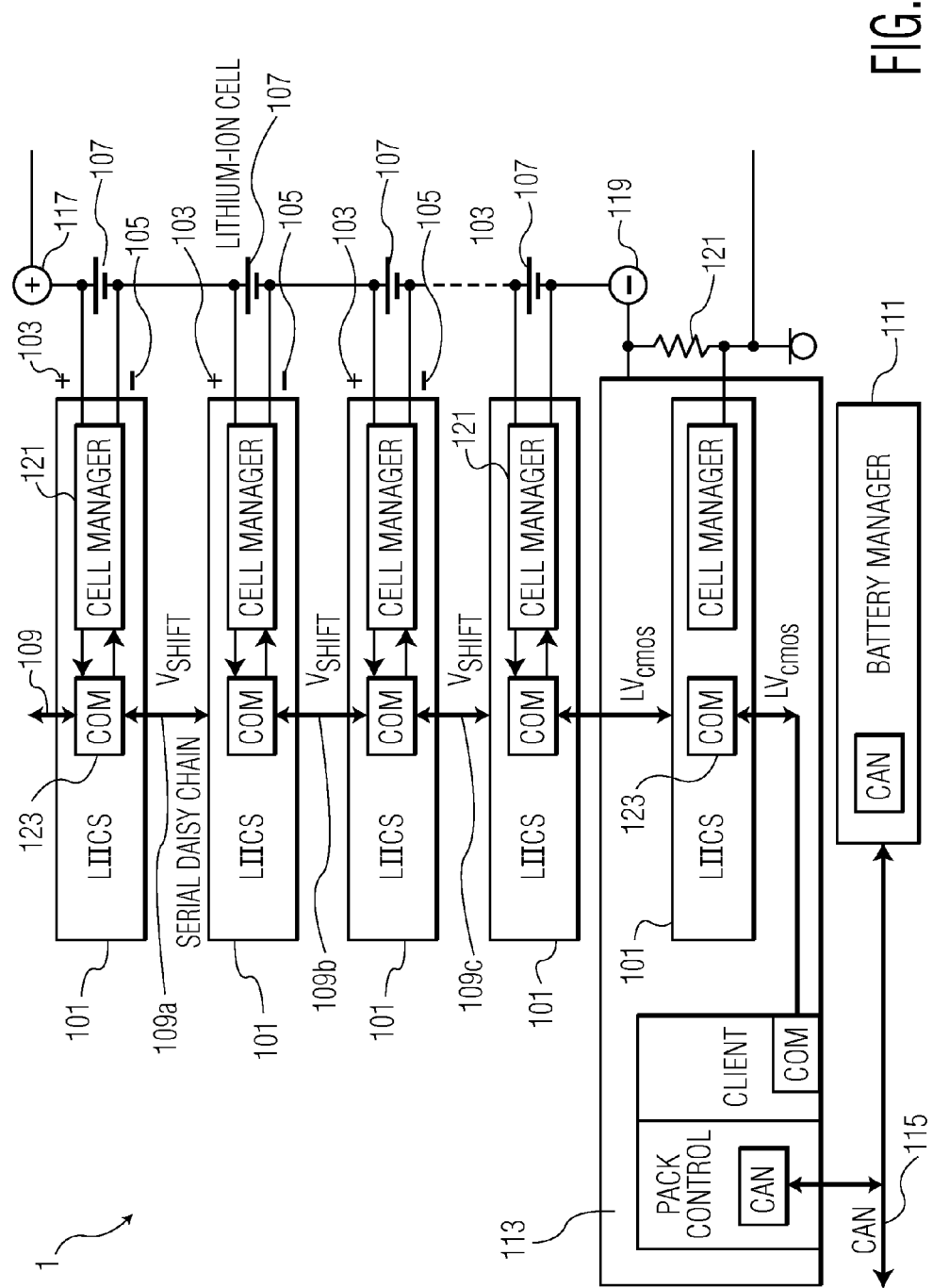
FIG. 1 is a schematic view of a battery system including a data communication bus.

As shown in FIG. 1, in battery pack 1, each LIICS circuit includes a cell manager 121 for monitoring and controlling the associated battery cell 107, and a communications section (COM) 123.

In this system a communication bus 109 is provided to send control data from the battery manager 111 towards each of the LIICS devices 101 and to receive at the battery manager 111 measurement data sent from each of the LIICS devices 101.

Among the pertinent features of the single-wire daisy-chain communication bus which has been developed are:

The host controls timing synchronization of the daisy-chained LIICS devices;

Communication from the host to the LIICS devices is performed in through mode, reducing latency; and Communication from the LIICS devices to the host is performed in shift mode, enabling a balanced timing budget for both near and remote LIICS devices, thereby avoiding latency issues.

Further advantages of this system are: (1) reduced mechanical complexity for both the battery cells and battery pack, and (2) a good match with the electric constraints of the cascaded battery cells (stacked voltages).

Battery Pack

A battery pack 1 in accordance with this system will now be described in with reference to FIG. 1.

As shown in FIG. 1, and by way of example and not limitation, LIICS 101 is an integrated circuit (IC) (not shown) mounted on a lead-frame (not shown), preferably molded inside the battery cell 107, and connected between the two poles 103, 105 of the battery cell 107. As depicted, each battery cell 107 of battery pack 1 has an associated LIICS device 101. Hence, each LIICS device 101 is powered by the associated local battery cell's voltage, which simplifies the system by avoiding the need for a dedicated power system configured to drive each of the LIICS devices. A bidirectional daisy-chain bus 109 is provided to enable communication between each of the LIICS devices 101 and the battery manager 111.

The battery cells 107 are cascaded in series, which results in a high working voltage between the two external battery terminals 117, 119 (e.g. <1000 V), as this limits the current (e.g. <100 Amperes) supplied to the vehicle's electric motor(s) (not shown). The series cell voltage configuration causes all but the first of the LIICS devices 101 to have a voltage offset with respect to ground. Yet, the voltage offset between two adjacent battery cells 107 is limited to a single cell voltage (Vbat=typically 3-4 V).

Optionally, 2 or more (n) cells can be connected to a single LIICS device. This LIICS device identical to a single cell device and shares its parameters on n sets of registers in this LIICS device.

By configuring the communication interface as a daisy-chain between successive LIICS devices 101, each bus interface 109a, 109b, 109c . . . needs to span only a single battery voltage (Vbat). The physical connection between two adjacent LIICS devices 101 therefore must accommodate a level-shift in the voltage of the interface signal. This arrangement avoids the need for expensive high-voltage components or galvanic isolation.

The pack controller 113 can be a standard component, which interfaces between the battery manager 111 (which can communicate with other vehicle components using a CAN bus 115) and the LIICS devices 101 (which use the daisy-chain bus 109). Optionally, the first cell-supervising LIICS device 101 in the daisy-chain bus 109 operates between ground and battery voltage (Vbat), hence it operates at the same voltage levels as the pack controller 113. This means that the first daisy chain segment does not require the specific voltage-shifting electrical interface of the other daisy chain segments, avoiding the need for an extra interface component. Consequently, low voltage CMOS switching levels can be used to transfer digital information over the first daisy-chain interface, reducing the complexity of the client.

As shown in FIG. 1, the pack controller 113 can be a standard component, which interfaces between the battery manager 111 (which can communicate with other vehicle components using a CAN bus 115) and the LIICS devices 101 (which use the daisy chain bus 109). Optionally, as an alternative to the arrangement described in the previous paragraph, the first LIICS device 101a in the daisy chain bus 109 would not be connected to a battery cell 107 but instead would be connected to a sense resistor 121, and in this arrangement it is able to measure the motor current in the system (use of the sense resistor 121 is by way of example only and not limitation—other configurations using different circuit elements such as a current source or a capacitor to provide the same functionality also could be provided). As shown in FIG. 1, it also operates between ground and battery voltage (Vbat), hence it operates at the same voltage levels as the pack controller 113 in LIICS 101. This means that the first daisy chain segment does not require the specific voltage-shifting electrical interface of the other daisy chain segments, avoiding the need for an extra interface component. Consequently, low voltage CMOS switching levels can be used to transfer digital information over the first daisy-chain interface.

A single-wire interface is used as a low cost solution for transferring the electrical data signals over the daisy-chain segments. The single-wire interface between adjacent LIICS devices 101a typically spans only a short distance (e.g. ~10 cm) and because that interface operates across the battery cell voltage Vbat (not the full battery pack voltage, which is approximately nVbat, where n is the number of battery cells in the battery pack and Vbat is the voltage across one such battery cell), the single-wire interface can be routed close to the power leads of the battery-cells without safety issues.

Communication over the daisy chain bus 109 needs to be bidirectional so that the battery manager 111 can issue commands to the battery cells' LIICS devices 101, and also receive information from those LIICS devices. 101.

More specifically, since the host (here, battery manager 111) must take care of initialization and application specific control settings for all the LIICS devices 101, the host must be able to send command information over the daisy chain bus 109 into the control registers (not shown in FIG. 1) of the LIICS devices 101.

The host also must be able to collect information such as status and measurement values from all the LIICS devices 101 over the daisy chain bus 109 (such information is first stored in the LIICS registers and then is sent to the battery manager 111).

Bidirectional Communication

The typical information flow in battery management systems, including that disclosed herein, is very regular. Such information flow is initiated and managed by the battery manager 111. The information can be transferred in fixed-size packets.

The host (battery manager 111) will send command packets to trigger specific actions or set specific parameter values in one or more slave devices (e.g., the LIICS devices 101). The host also can interpret confirmation packets received from the slave devices. Thus, during operation there will be bidirectional information flow.

Slave devices can interpret command packets sent by the host, relay such command packets to the next slave device ("next" meaning, for a particular slave device, the adjacent slave device which is located further from the host), and will send their confirmation packets towards the host after each command packet received from the host. Confirmation packets from a slave device will be relayed towards the host by prior slave devices ("prior" meaning, for a particular slave device, the adjacent slave device which is located closer to the host). Other than relaying a confirmation packet from another slave device that is further from the host, each slave device is not able to directly communicate with other slave devices, meaning one slave device cannot control another.

For any command packet the host sends, the host will receive a confirmation packet from each slave device that forwards the command packet to another slave device (in the absence of such a confirmation packet the host could resend the command packet or trigger an alarm). This stepwise relaying of confirmation packets by successive slave devices toward the host means there will be a significantly higher bandwidth demand for the information-flowing towards the host (battery manager 111) than away from the host.

A half-duplex communication link can efficiently meet the stated data transfer requirements (other communications schemes such as full-duplex communication could also be used). For half-duplex communication, Time Division Multiplexing (TDM) can be used to switch the direction of the information flow on the daisy chain bus 109, while cycling through the process of sending a command packet (~1% of the data flow) and receiving confirmation packets (~99% of the data flow). Bus arbitration is not required.

Figure 2:
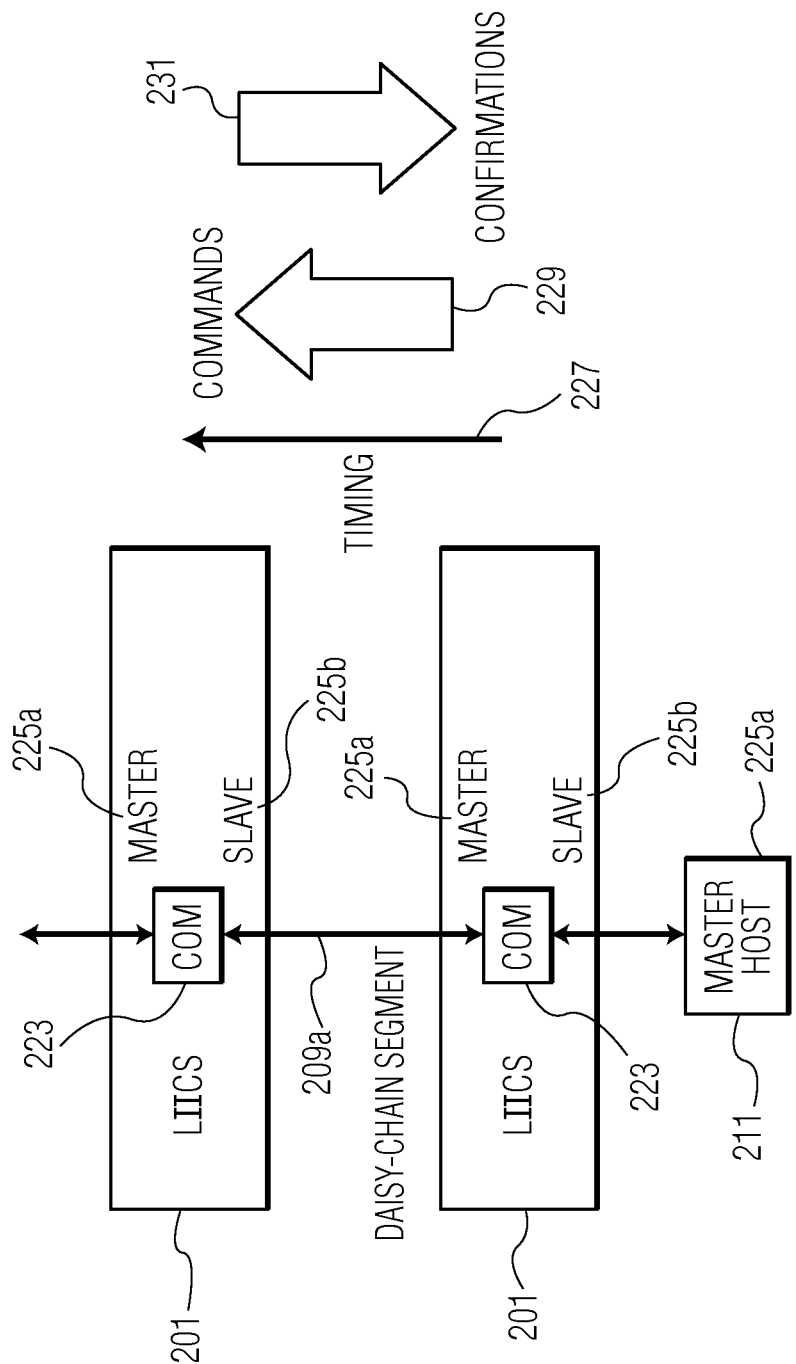
FIG. 2 is a schematic diagram reflecting communication between two adjacent battery cell communication nodes.

Turning to FIG. 2, each daisy chain bus segment 209a is located between two successive LIICS devices 201, with each bus segment 209a being connected to the master terminal 225a of one LIICS device 201, and to the slave-terminal 225b of another LIICS device 201. The master and slave terminals 225a, 225b are part of the LIICS device's COM section 223. As shown in FIG. 2, the master and slave terminal designations are defined by the positions of those terminals relative to the host—for each daisy chain bus interface 209a, the host terminal is the terminal 225a located nearer to the host device 211 (e.g. the battery manager 111 shown in FIG. 1 or master host 211 shown in FIG. 2) and the slave terminal 225b is the terminal located further from the host device. Note that the master and slave terminals are reversed for each LIICS device 201—the master terminal

225a is the terminal further from the host 211, and the slave terminal 225b is the terminal nearer to the host 211.

The host is the source of real-time reference signals used by the LIICS devices 201 to effect the transfer of data. The host's timing triggers are propagated through the system from the host to the slaves (in the direction of arrow 227), along with any data being transferred outward from the host to the slave devices (LIICS devices 201). Only the host 211 can take the initiative to start transactions, that is, transferring command data and confirmation data. As shown in FIG. 2, command data flows in the direction of arrow 229 outward the host 211 (arrow 229), and confirmation data flows in the direction of arrow 231 towards the host 211. Both are timed by timing triggers sent out by the host.

Daisy Chain Data Transfer

In a daisy chain line topology there are two modes of data transfer, shift mode and through mode.

Shift mode will now be described with reference to FIG. 3A. As already explained, communication from the LIICS devices 301 to the host 311 is performed in shift mode.

Figure 3A:
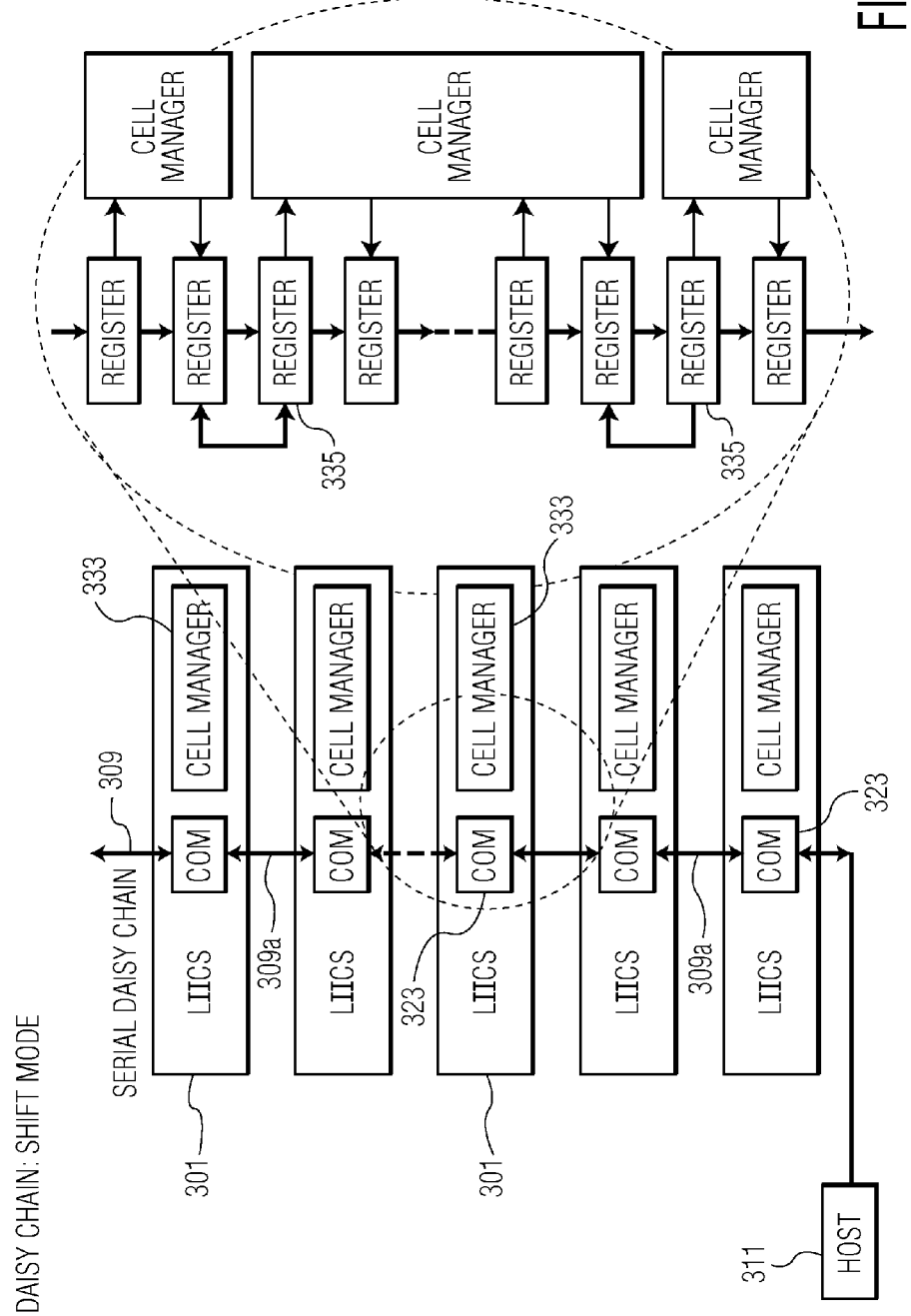
FIGS. 3a and 3b are schematic diagrams reflecting operation of the battery system in through mode and shift mode, respectively.

When all bits of all registers 335 of all LIICS devices 301 are put in series, data can be shifted (transferred) to/from all locations in shift mode, as is shown in FIG. 3A. The data is shifting substantially simultaneously, controlled by the timing triggers sent by the host. In this case the addressing of data is implicitly determined by the order of the registers 335 in the daisy chained LIICS devices 301 and the order of bits in those registers 335. This is beneficial for the efficiency of communication bandwidth. As all elements in the daisy chain of LIICS devices 301 can shift at the same moment in time, all LIICS devices 301 can transfer data in parallel (the data bits move in lockstep), providing a large overall bandwidth in the system. For simplicity, typically all of the data in all of the registers 335 of all the LIICS devices 301 is transferred through the system, even register data which need not be updated. Thus, shift mode is well-suited for sending confirmation messages from the LIICS devices 301 to the host 311. However, in situations where only a small amount of data needs to be transferred, this mode of operation can adversely affect the communication bandwidth. Each LIICS device 301 can interpret the data which it receives from the input segment (that being the master terminal or slave terminal, depending upon the direction in which data is flowing) before transferring that data to the output segment. Also the LIICS device 301 can replace the received input data with alternative output data, specifically, when the input data is not relevant for the following transfers in the chain. In case a detected error occurred while sending a command, the response to the corrupted command is not relevant, and can be replaced with more detailed information on the transmission error.

Figure 3B:
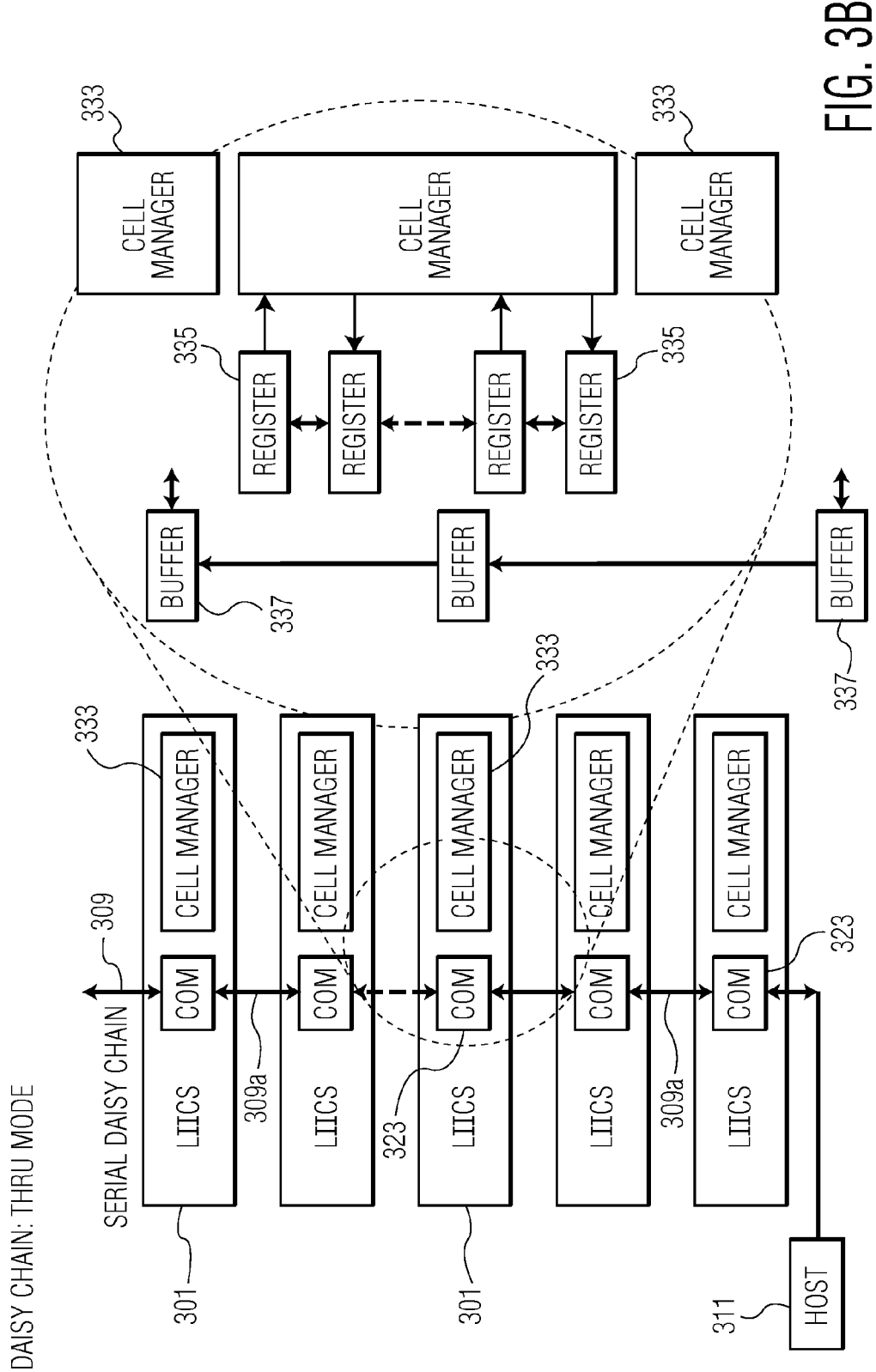

Through mode will now be described with reference to FIG. 3B. As noted above, communication from the host 311 to the LIICS devices 301 is performed in through mode, reducing latency.

As an alternative to shift mode, data can be transferred in through mode with a minimum latency from one daisy chain segment to the next. To use through mode data transfer, each individual battery COM unit 323 has a data buffer 337. All of the data stored in the registers 335 of a given battery cell manager is transferred via buffer 337 of that LIICS. In this mode the transferred input data cannot be interpreted, modified or updated before it is transmitted to the next daisy chain segment. Since the data has a low transfer latency, through mode is well-suited for use with command messages, where a single message is sent to all the slave LIICS devices 301. Specific messages intended for a single slave LIICS device 301 should be labeled with an address, as this will allow message filtering by the LIICS devices 301.

Returning to FIG. 1 (and also with the other drawings in mind), the dataflow in a battery management system is typically very regular, with the individual battery cell managers periodically reporting the tracked parameters to the battery manager (e.g., temperature and voltage), and the battery manager instructing the battery cell managers when necessary (for example, if the battery manager determines charge bleeding is needed to maintain the battery pack's performance). The battery manager 111 periodically sends command messages towards the LIICS devices 101 about 10 to 100 times/second, sometimes with a device specific setting, but often as a generic command applicable to all LIICS devices 101 such as a routine status inquiry to which the individual LIICS devices 101 reply with various physical parameters (these are typically command messages best sent in through mode). For each command message sent by the battery manager 111, all LIICS devices 101 will reply with a confirmation message sent towards the battery manager 111, such as their status and measurement data.

For optimal performance of the system, through mode data transfer is used for sending command messages from the battery manager 111 to the LIICS devices 101, while shift mode data transfer is used to receive at the battery manager 111 all the confirmation messages with status and measurement values sent by the LIICS devices 101.

Figure 4:
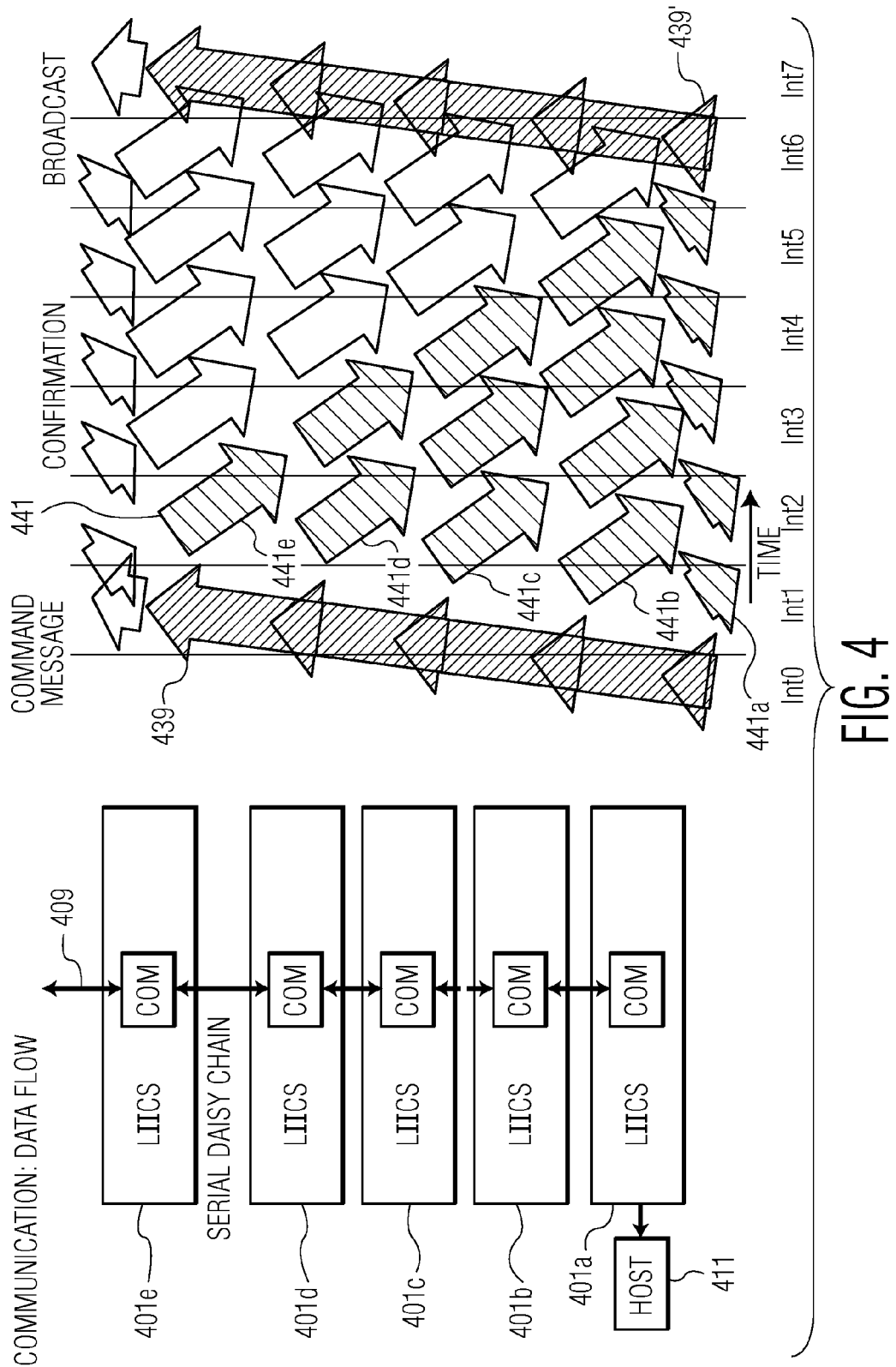
FIG. 4 is a timing diagram showing data flow according to one embodiment.

FIG. 4 shows, for an embodiment, the data flow in the system over time. Int0-Int6 represent timing intervals during which data is transferred between the depicted devices, A data transmission cycle commences when, at time interval Int0, host 411 initiates a write broadcast command 439, sending data to the LIICS device 401a nearest to the host 411, preferably using through mode communication. While the LIICS device 401a is receiving the commands, it immediately forwards the command to the LIICS device 401b, which in turn immediately forwards the command to the next device. That broadcast command 439, as it propagates, will be interpreted by one or more LIICS devices 401. All of the LIICS devices 401 reply to the host 411 with their confirmation message, most likely, in shift mode. While five LIICS devices 401a-e are depicted, this is only illustrative, and it will be appreciated that more or fewer LIICS devices could be provided.

In further detail, the broadcast command 439 is shown as a line having a series of slanted upward pointing arrows. The lowest arrow in the Int0 time slot corresponds to the broadcast command as sent by the host 411 to the first LIICS device 401a. The vertical component of the arrow's vector reflects the propagation of the broadcast command from LIICS device 401a to the adjacent LIICS devices 401b-e, further away from the host 411. The horizontal component of that arrow's vector reflects the latency of the broadcast command as it propagates over time (issues of latency are discussed in more detail below). As shown in FIG. 4, the propagating broadcast command 439 reaches the last LIICS device 401e at Int1. Then, following the period Int1-Int5, discussed in detail in the next paragraph, a new command message 439' is sent to LIICS devices 401a-e in like manner.

FIG. 4 also shows the replied confirmation messages 441a-e (shown as multiple lines having multiple arrows, to reflect the propagation and latency as the messages transfer from one LIICS device to another) from the LIICS devices 401a-e to the host 411. Such transmission is preferably effected using shift mode communication. For present purposes it is sufficient to note that the LIICS devices 401a-e receive timing triggers (not shown) from the host 411.

Immediately after the broadcast command message 439 has been received by a LIICS device 401, it starts sending its confirmation message 441 to the host 411. LIICS device 401*a* will start sending its confirmation data even before the related command has reached the last LIICS device 401*e*. Slightly later the next LIICS device 401*b*, after having received the broadcast command message 439 from LIICS device 401*a*, will start sending confirmation message 441*b* to LIICS device 401*a*, which temporarily buffers this confirmation message 441*b*, while it is still sending message 441*a*. During the next cycle Int2, LIICS device 401*a* relays confirmation message 441*b* to host 411. The sending of confirmation messages 441 via the LIICS devices 401*a-e* continues until, at the end of Int5, all the confirmation message 441*a-e* have been propagated to the host 411. It should be understood that the number of LIICS devices 401*a-e* depicted is only by way of example and not limitation—fewer or more LIICS devices 401 could be provided.

It should be noted that the confirmation message 441*e* from the most distant LIICS device 401*e* reaches the host 411 at the end of Int5. The host 411 then is able to send a new command message 439' to LIICS devices 401*a-e* starting at the beginning of Int6, and the communication process repeats for that new command message.

Figure 5:
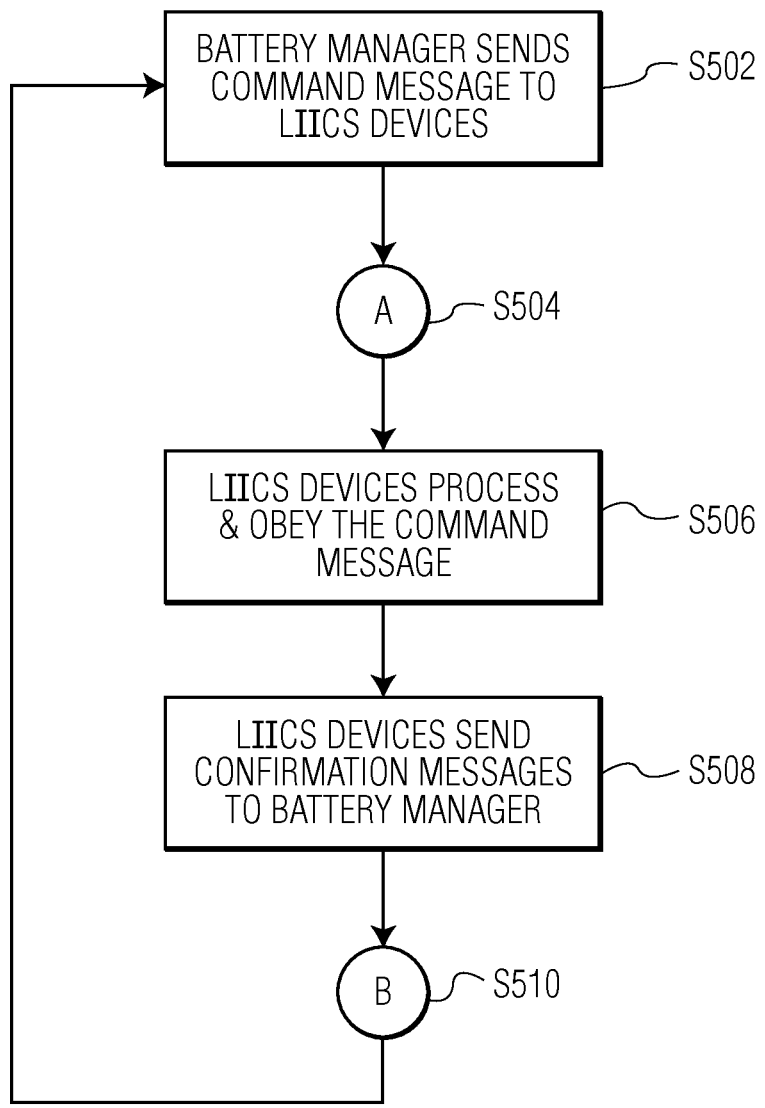
FIG. 5 is a flowchart depicting the sending of broadcast and confirmation messages in a battery system.
Figure 6:
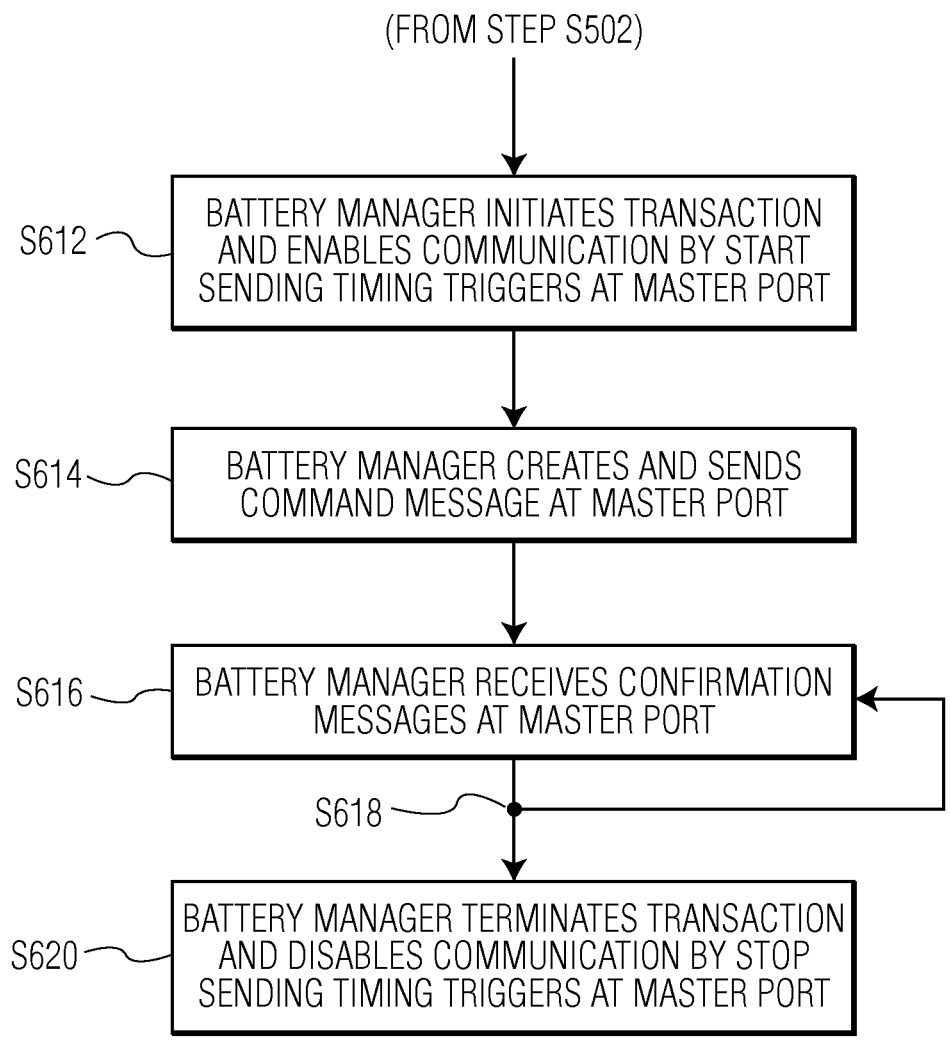
FIG. 6 is a flowchart depicting in detail the sending of command messages.

The foregoing will be particularly clear in view of FIG. 5, which is a flowchart illustrating aspects of the transfer of messages in this battery system in one message cycle. In step S502, the battery manager sends a command message to the adjacent first LIICS device (as noted above, the message is relayed stepwise from each LIICS device to the next LIICS device). Step S504 reflects the detailed operations which are involved in such stepwise relaying of the command messages, and those details are shown in FIG. 6. In step S506, the LIICS devices process and obey the command message. In step S508, the LIICS devices send confirmation messages to the battery manager. Step S510 reflects the detailed operations which are involved in the sending of confirmation messages from the LIICS devices to the battery manager, such details being shown in FIG. 7. Following step S510, a new message cycle begins at step S502.

FIG. 6 depicts various aspects of the relaying of command messages from the battery manager side bus towards the LIICS devices towards the other end of the bus. At step S612, the battery manager initiates a transaction with the nearest LIICS device (101*a* in FIG. 1), and enables communication among the LIICS devices by commencing to send timing triggers at the master port of the nearest LIICS device (master port 225*a* is shown in FIG. 2). In step S614, the battery manager creates and sends a command message to the master port of the nearest LIICS device. Then, at step S616, the battery manager receives confirmation messages at the master port. The looping path leading back to step S616 leading away from branch point S618 reflects the processing which occurs as the battery manager iteratively receives confirmation messages from successive LIICS devices. At step S620 the battery manager, having received the last confirmation message from the most remote LIICS device, terminates the transaction and disables communication by stopping the sending of timing triggers at the master port.

Figure 7:
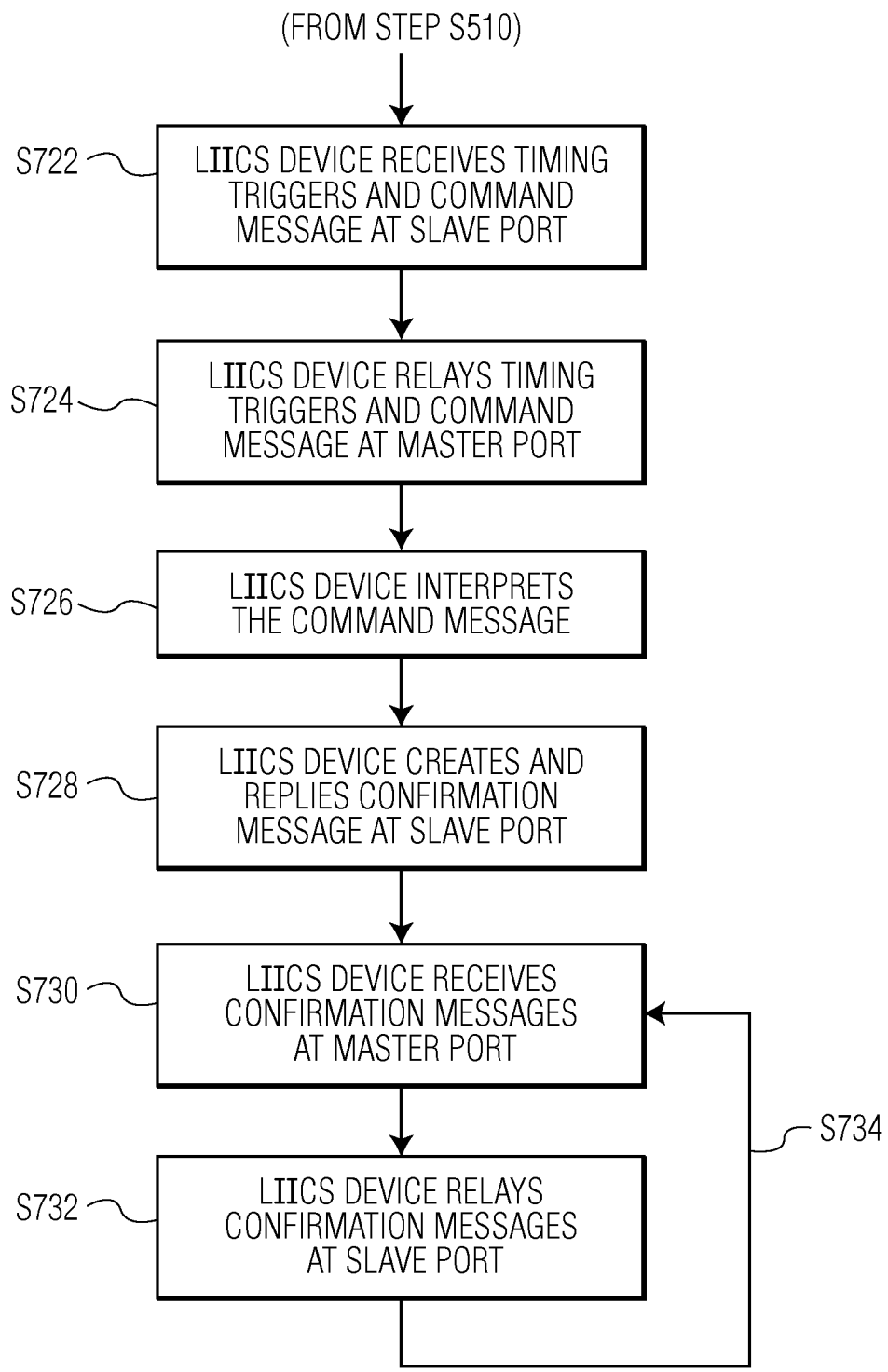
FIG. 7 is a flowchart depicting in detail the sending of confirmation messages.

FIG. 7 depicts various aspects of the relaying of confirmation messages from the LIICS devices to the battery manager. At step S722, the LIICS device receives at its slave port (slave port 225*b* is shown in FIG. 2) timing triggers and a command message. At step S724, the LIICS device relates the timing triggers and the command message via its master port. The LIICS device, in step S726, interprets the command message. At step S728, the LIICS device creates a confirmation message and replies to the battery manager by sending that confirmation message via the slave port. At step S730, the LIICS device receives at its master port confirmation messages (from other LIICS devices which are more remote from the battery manager). The LIICS device then relays those confirmation messages via the slave port, at step S732. The looping path S734 leading back to step S730 reflects the processing which occurs as the LIICS device iteratively receives successive confirmation messages from the more remote LIICS devices (after the last such confirmation message is received, processing stops for the current message cycle (not shown)).

Managing Latencies

As the transfer of data over a daisy chain bus is not infinitely fast, in part because of processing delays in the linked devices which transfer such data, propagation delays will arise. Consequently, transferring a signal over a daisy chain bus as disclosed will take some time, in part because of time needed for the capturing, buffering and re-transmitting of a signal by one daisy chain segment to the next daisy chain segment.

To improve the reliability of communication in the daisy chain bus in both directions, each bit is filtered and validated during its complete symbol-period and only after the interpretation of a bit, is the bit relayed to the next LIICS device. This implies that the propagation delay will be a one bit-period, because it takes at least one bit-period to propagate the bit from one LIICS device to the next, meaning the minimum bus segment latency is Tbit (about 4 µs, for example). It follows that the minimum time needed for a command message to travel from the host to the last slave device on the bus (e.g. the last of a total of 254 slave devices) is 254*Tbit. For 32 bits/frame communication it follows that the first slave in the chain (and possibly other slaves close to the host) will have finished replying to the host with its confirmation message(s) before the last slave device has detected the beginning of the broadcast command. In other words, there may be a period where parts of the daisy chain bus are still idle and slave devices are waiting to receive the host's command message.

A corresponding bus segment propagation delay can occur during the transmission of a confirmation message from a slave device to the host (most likely, performed using shift mode). Such propagation delays may cause problems, as the host must wait at regular intervals before it can capture the response of each LIICS device.

Sending of the confirmation data is triggered (at the LIICS device) by receipt of the broadcast command (sent by the host) and so such confirmation data is returned to the host with a very short timing latency. Yet, for each more remote daisy chain segment, the return of confirmation data takes two segment latency periods extra, as two extra bus segments need to be spanned. As a solution, the communication registers 335 are used to compensate for this timing issue, they introduce a delay while shifting through the chain of registers. As long as the communication latency over a single bus segment is less then half the capacity of this shift register, the shift register can compensate for the late response of the more remote LIICS devices, while the shift register is still sending its own confirmation message, the confirmation message of the more remote LIICS is captured and shifted into this same shift register.

A read pointer is defined to locate the position of the local or relayed confirmation data to be sent towards the host. A write pointer is defined to locate the position of the incoming confirmation data, such that it is well-aligned with the timing of outgoing confirmation data.

This means that all confirmation messages will arrive at the host as a concatenated stream of data and such confirmation messages will arrive immediately after the host has finished sending a broadcast command.

Acknowledge

As discussed above, a battery management system includes a single master device (host), which takes all initiatives such as issuing commands and collecting responses. Local cell managers (LIICS devices) are slaves and they only respond to instructions from the host. When the host sends an instruction to one or more slaves, the host demands confirmation from the slave device(s) that the instruction has been correctly received.

The bus system is configured as a daisy chain in a line topology and includes a host and up to 254 LIICS devices and bus segments. The LIICS devices and the bus segments both introduce a timing latency. This latency corresponds to one bit period per bus segment.

In the situation where a single LIICS device would be addressed, both upstream and downstream delays should be taken into account. It would be very complex to support a generic message acknowledgement service, as these latency delays can be rather long and vary with the distance between the host and a particular LIICS device "LIICS(n)" (where n is expressed as the number of segments between the particular LIICS device and the host). With each individual LIICS device (LIICS, LIICS(1), LIICS(2) . . . LICS(n) . . . LICS(254)) sending an acknowledgement message immediately after receiving an instruction, the related latency and latency variations caused by up to 254 acknowledgement messages being transmitted by the LIICS devices would make the system very complex.

A more advanced implementation is for each LIICS device to send towards the host its acknowledgement in combination with regular confirmation data. Each message sent by the host to one or more LIICS devices will cause every LIICS device to return toward the host a message, the message including both acknowledgement and status information. As the amount of messages to be send by the host are rather limited and often requires the return of a large amount of data, the overhead and complexity of this acknowledge method are quite reduced as compared to a generic message acknowledgement service as mentioned above.

Also, in instances where commands are sent that would not require the return of data to the host (e.g. commands from the host which might only set control data or trigger an event at the LIICS devices), each LIICS device still will send a confirmation message. In this case a (at least partial) copy of the transmitted payload data is returned to the host, which can be used by the host to determine whether the sent data arrived correctly at the desired LIICS device, thereby increasing the reliability of the system.

Service Request

Again, a battery management system includes a single master device (host), which takes all initiatives with respect to the associated slave devices (e.g., sending commands and queries). In the described system, the LIICS cell supervisors are slaves and only respond to instructions from the master device. LIICS devices do not control each other.

This type of system may require two types of interrupts: (1) the master device (host or battery controller) forcing control over the (locked) system; and (2) a slave, e.g. the LIICS device, requesting a service due to an alarm condition.

When, while sending a command, the master may want to send an interrupt to one or more slave devices, it needs not only to wait until it has completely sent the command, but also must wait until all slaves have confirmed this message. When an interrupt needs to be served on short notice, e.g. in case of an emergency stop, waiting might take too long. In this case the master can abort the current transaction by stopping the sending of the related timing triggers. Next, the master can issue a new command to one or more LIICS devices containing the interrupt information.

By way of non-limiting example, a LIICS device may need to request attention of the host due to a specific condition, e.g. an over/under voltage in a battery cell, over/under battery cell temperature, or a communication error. In a battery management system these requests typically allow for a response latency of a few seconds during operation (while driving or charging), and up to a few hours when the system is idle (while parking and not charging).

The host is able to detect a service requesting LIICS device by either an interrupt mechanism or continuous polling. An interrupt mechanism requires a (independent) medium to transfer the request. Depending on the physical implementation of a battery manager interface, a possible implementation for such an interrupt mechanism could be to modulate the requests in a full-duplex channel over a transmission medium, e.g. by sending a specific frequency over the single wire, to be detected by the master. However, according various requirements for the battery pack outlined earlier, it would not be feasible to provide additional wiring for this purpose. Thus, the interrupt mechanism approach presently is not preferred.

The continuous polling approach is presently preferred—as the battery manager typically requests a continuous stream of measurement data from the LIICS devices, the polling of interrupt requests is preferably combined with the regular transfer of these data packets, which data packets already include device identification information. For this purpose some extra information can be stored in a data packet.

In the situation where a LIICS device requests service from the host, a service request flag is set, requesting attention from the master. When the request is urgent, due to an emergency condition, the content of the confirmation packet sent by the LIICS device to the host can replaced with additional status information on the emergency condition. In this way the master need not request this additional data in a separate command, reducing the interaction latency. In the packet sent to the host by the LIICS device, an acknowledge flag is set to false, to identify to the host that there is an exception, and a status flag is set to signal to the host that there is a pending service request. These flags are not part of the payload data.

The host device typically captures measurement data from all of the LIICS devices at a rate of about 10 samples per second, which is a sampling rate that should be sufficient to meet the timing requirements for interrupt requests.

The embodiments described above are well-suited for use in a battery management system wherein each battery cell includes an integrated circuit which can accurately and effectively monitor all relevant parameters of the battery cell. In such a system each battery cell is controlled by a LIICS circuit, which can enable new features through the local measurement and preprocessing of data derived from the battery cell.

An application specific communication bus as described herein permits the transfer of control data from the battery manager (host) towards the LIICS devices (slaves), and the transfer of measurement data from the LIICS devices back towards the battery manager. Only the LIICS devices employ the daisy chain interface with a PHY containing a dedicated level-shifter, the host PHY can be implemented using standard digital interface components, as this daisy-chain bus node does not required level-shifting. As shown in FIG. 1, host 111 can include a CAN transceiver facilitating communication between the battery manager and other vehicle components such as various control modules and data recorders (not shown).

The embodiments described herein are not limited to electrical vehicles, and can also be employed in other application domains, e.g. Uninterruptable Power Supplies (UPS) and photovoltaic energy storage systems.

Various exemplary embodiments are described in reference to specific illustrative examples. The illustrative examples are selected to assist a person of ordinary skill in the art to form a clear understanding of, and to practice the various embodiments. However, the scope of systems, structures and devices that may be constructed to have one or more of the embodiments, and the scope of methods that may be implemented according to one or more of the embodiments, are in no way confined to the specific illustrative examples that have been presented. On the contrary, as will be readily recognized by persons of ordinary skill in the relevant arts based on this description, many other configurations, arrangements, and methods according to the various embodiments may be implemented.

The use of section headings in this document only is for reader convenience, and such headings should not be construed as limiting.

In successive drawings, analogous references numbers incremented by 100 have been used for like structures. For example, in FIGS. 1, 2, 3A, 3B and 4, the battery manager/host is identified with reference numerals 111, 211, 311 and 411, respectively.

To the extent positional designations such as top, bottom, upper, lower have been used in describing this invention, it will be appreciated that those designations are given with reference to the corresponding drawings, and that if the orientation of the device changes during manufacturing or operation, other positional relationships may apply instead. As described above, those positional relationships are described for clarity, not limitation.

The present invention has been described with respect to particular embodiments and with reference to certain drawings, but the invention is not limited thereto, but rather, is set forth only by the claims. The drawings described are only schematic and are non-limiting. In the drawings, for illustrative purposes, the size of various elements may be exaggerated and not drawn to a particular scale. It is intended that this invention encompasses inconsequential variations in the relevant tolerances and properties of components and modes of operation thereof. Imperfect practice of the invention is intended to be covered.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

What is claimed is:

1. A battery pack, comprising:
   a first battery terminal and a second battery terminal;
   a plurality of battery units, each said battery unit comprising;
     a battery cell;
     a cell supervisor electrically connected to the battery cell, the cell supervisor comprising a set of registers put in series; and
     a communication section configured to communicate with the cell supervisor, the communication section comprising a data buffer;
     wherein all of said battery cells are connected serially between the first battery terminal and the second battery terminal;
   a plurality of bus interfaces arranged in alternating fashion with said battery units to define a daisy chain bus, each said bus interface configured for signal communication, each said bus interface respectively connecting the communication sections of two adjacent said battery units; and
   a battery manager configured to communicate with said battery units via the daisy chain bus,
   wherein the battery pack is configured so that the battery manager sends a command message to the battery units using a through mode protocol, and each said battery unit sends at least one of a confirmation message and a service request to the battery manager using a shift mode protocol, wherein in the through mode protocol, data is transferred via the data buffer, while in the shift mode protocol, data is shifted along the set of registers.

2. The battery pack according to claim 1, further comprising a communication module including a cell manager, the communication module being configured for signal communication between the battery manager and the daisy chain bus.

3. The battery pack according to claim 2, wherein the cell manager is electrically connected across a resistor, the resistor being connected between ground potential and one of the first battery terminal and the second battery terminal.

4. The battery pack according to claim 1, configured so that communication between the battery manager and the battery units is effecting using half-duplex communication with time division multiplexing.

5. The battery pack according to claim 1, configured so that, when the battery manager sends the command message to the battery units using the through mode protocol, all of the battery units receive the command message with all of the battery units except the battery cell most remote from the battery manager relaying the command message to a next said battery unit.

6. The battery pack according to claim 1, wherein the confirmation message includes data reflecting a condition of the battery cell.

7. The battery pack according to claim 1, configured so that, when each said battery unit receives the command message that said battery unit sends at least one of the confirmation message and the service request towards the battery manager.

8. The battery pack according to claim 7, wherein that said battery cell sends at least one of the confirmation message and the service request towards the battery manager by forwarding the at least one of the confirmation message and the service request to an adjacent said battery unit which is closer along the daisy chain bus to the battery manager.

9. A battery unit for use in a battery pack having battery manager, the battery unit comprising:
   a battery cell;
   a cell supervisor electrically connected to the battery cell, the cell supervisor comprising a set of registers put in series; and
   a communication section configured to communicate with the cell supervisor, the communication section comprising a data buffer;
   wherein the battery unit is configured to receive a command message from the battery manager using a through mode protocol, and to send at least one of a confirmation message and a service request to the battery manager using a shift mode protocol, wherein in the through mode protocol, data is transferred via the data buffer, while in the shift mode protocol, data is shifted along the set of registers.

10. A battery unit according to claim 9, wherein the confirmation message includes data reflecting a condition of the battery cell.

11. A battery unit according to claim 9, configured so that, when the battery unit receives the command message, the battery unit sends at least one of the confirmation message and the service request towards the battery manager.

12. A method of communication via a daisy chain bus connecting a battery manager and a plurality of battery units, comprising:
   sending, via the daisy chain bus, a command message from the battery manager to the battery units using a through mode protocol, wherein in the through mode protocol, data is transferred via a plurality of data buffers each arranged in each of the battery units; and
   sending, via the daisy chain bus, at least one of a confirmation message and a service request from at least one said battery unit to the battery manager using a shift mode protocol, wherein in the shift mode protocol, data is shifted along a plurality of sets of registers each set put in series in each of the battery units.

13. The method according to claim 12, further comprising using half-duplex communication with time division multiplexing to effect the sending of the command message and the sending of at least one of the confirmation message and the service request.

14. The method according to claim 12, wherein the sending of the command message to the battery units includes all of the battery units receiving the command message with all of the battery units except the battery unit most remote from the battery manager relaying the command message to a next said battery unit.

15. The method according to claim 12, wherein the confirmation message includes data reflecting a condition of the battery cell.

16. The method according to claim 12, further comprising, when each said battery unit receives the command message, that said battery unit sending at least one of the confirmation message and the service request towards the battery manager.

17. The method according to claim 16, wherein the sending by that said battery unit of at least one of the confirmation message and the service request towards the battery manager includes forwarding the at least one of the confirmation message and the service request to an adjacent said battery unit which is closer along the daisy chain bus to the battery manager.

18. The method according to claim 12, further comprising:
   sending, from the battery unit to the battery manager, an acknowledgement message including an acknowledgement and at least one of status information and battery cell data.

19. The method according to claim 12, further comprising:
   sending, from the battery manager, an interrupt message to at least some of the battery units forcing control over the system.

20. The method according to claim 12, further comprising:
   sending, from a battery unit, a service request message to the battery manager requesting a service due to an alarm condition.

* * * * *